A. S. KEEN.
BELT.
APPLICATION FILED MAY 9, 1913.
1,147,869.
Patented July 27, 1915.
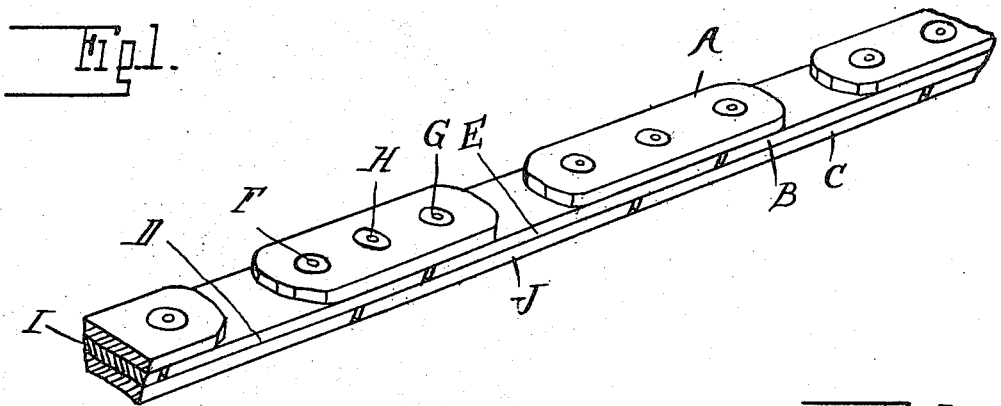
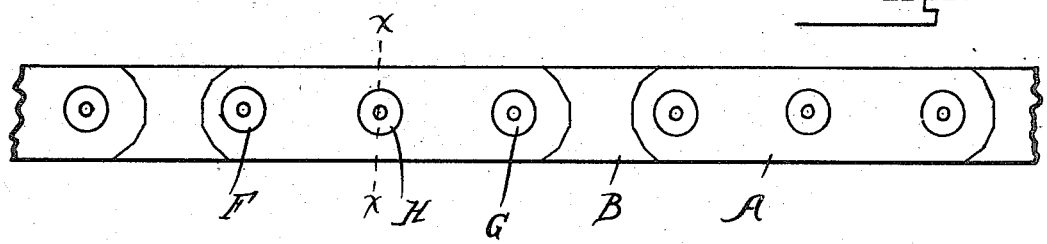
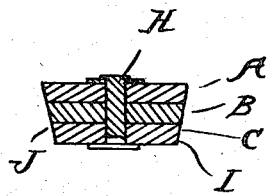
Witnesses
J. B. Ford
James P. Barry
Inventor
Albert S. Keen
By Whitman Wilbert Whitmore
Attys

UNITED STATES PATENT OFFICE.

ALBERT S. KEEN, OF DETROIT, MICHIGAN.

BELT.

1,147,869.

Specification of Letters Patent.   Patented July 27, 1915.

Application filed May 9, 1913.   Serial No. 766,570.

*To all whom it may concern:*

Be it known that I, ALBERT S. KEEN, a citizen of the United States of America, residing at Detroit, in the county of Wayne and State of Michigan, have invented certain new and useful Improvements in Belts, of which the following is a specification, reference being had therein to the accompanying drawings.

My invention relates to driving belts and has among the objects thereof to provide an efficient belt which may be easily and cheaply manufactured, and to provide a belt which, while composed of a plurality of plies, will however, have sufficient flexibility.

Other objects of the invention will more fully hereinafter appear.

The invention resides in the peculiar construction, arrangement and combination of parts as herein set forth and claimed.

Although my invention may be embodied in various types of belts it is especially designed and adapted for belts used with grooved pulleys, and I will therefore, illustrate and describe the invention as embodied in a belt of wedge-shaped cross-section.

In the drawings, Figure 1 is a perspective view of a belt embodying my invention; Fig. 2 is a cross-section on the line x—x of Fig. 3; and Fig. 3 is a top plan view.

The belt is formed of a plurality of plies of leather or the like, three being shown in the structure illustrated in the drawings, namely, A B and C. These plies are superimposed and preferably lie in the same plane. Two or all of the plies are each formed of a plurality of comparatively short sections D E, etc., preferably of the same thickness through their entire length, the adjacent sections of the inner ply or plies having their ends slightly spaced so as to permit the ply to flex when passing around a small pulley or the like. The sections of one ply serve to connect the sections of the adjacent ply. Preferably each section is secured as by means of rivets F G to the member of the adjacent ply in proximity to opposite ends thereof, and also by an intermediate member as the rivet H.

In order that the sections may be interchangeable I find it desirable to make the sections of equal lengths and in such case the securing means such as the rivets, are equally spaced, permitting the rivet holes to be punched in the members of the plies before they are assembled.

The structure hereinbefore described not only provides a belt of the desired strength, but as the sections are comparatively short, permits the belt to be formed of scrap leather and to be made of any length by merely adding sufficient sections to each ply. The spacing of the adjacent ends of the sections and the thickness of the belt, together with the spacing of the rivets, may be of course, varied to best suit the use to which the belt is to be put. It will also be noted that when the belt is formed, the driving faces I J are each composed of the sides of members lying in the same plane, and that the connection between these parts is such as to maintain the driving faces true.

What I claim as my invention is:—

1. In a belt, two superimposed plies, each formed of a plurality of comparatively short sections, the sections of one ply alternating with those of the other, and the ends of each section of one ply being respectively secured to an end of one section and the center of an adjacent section of the other ply.

2. In a belt a plurality of superimposed plies, each comprising a plurality of short sections spaced from each other, the ends of the sections being substantially rounded, and fastenings passing through each section of each ply and through a plurality of sections of each other ply.

3. A belt comprised of three plies of material, each ply consisting of a plurality of short sections, the joints of each ply being staggered relative to those of the other two plies, and rivets passing substantially through the center of each section of each ply and through the opposite ends of two sections respectively, in the other two plies.

In testimony whereof I affix my signature in presence of two witnesses.

ALBERT S. KEEN.

Witnesses:
 JOSEPHINE MICHELS,
 THOS. YERNAEY.